United States Patent
Lemonds et al.

(10) Patent No.: US 8,507,622 B2
(45) Date of Patent: Aug. 13, 2013

(54) POLYMERIZABLE COMPOSITIONS

(75) Inventors: Andrew Lemonds, Schwenksville, PA (US); Robert Wilczynski, Yardley, PA (US)

(73) Assignee: Rohm and Haas Company, Philadelphia, PA (US)

( * ) Notice: Subject to any disclaimer, the term of this patent is extended or adjusted under 35 U.S.C. 154(b) by 187 days.

(21) Appl. No.: 12/798,061

(22) Filed: Mar. 29, 2010

(65) Prior Publication Data
US 2010/0249348 A1 Sep. 30, 2010

Related U.S. Application Data

(60) Provisional application No. 61/211,419, filed on Mar. 30, 2009.

(51) Int. Cl.
*C08F 2/00* (2006.01)
*C08F 18/00* (2006.01)
*C08F 212/00* (2006.01)
*C08F 118/02* (2006.01)

(52) U.S. Cl.
USPC ............ 526/233; 526/292.3; 526/307.5; 526/319

(58) Field of Classification Search
USPC .............. 526/233, 292.3, 307.5, 319
See application file for complete search history.

(56) References Cited

U.S. PATENT DOCUMENTS

| 3,004,056 | A | | 10/1961 | Nunn, Jr. | |
| 3,574,794 | A | | 4/1971 | Hargis, Jr. | |
| 3,626,035 | A | | 12/1971 | Ernst | |
| 3,686,371 | A | | 8/1972 | Hasegawa | |
| 3,855,364 | A | * | 12/1974 | Steckler | 558/114 |
| 4,101,490 | A | | 7/1978 | Pons et al. | |
| 4,110,285 | A | | 8/1978 | Pons et al. | |
| 4,442,239 | A | | 4/1984 | Tsunekawa et al. | |
| 4,596,857 | A | * | 6/1986 | Doi et al. | 525/255 |
| 5,919,836 | A | | 7/1999 | Reinhardt | |
| 2003/0018103 | A1 | * | 1/2003 | Bardman et al. | 523/204 |
| 2008/0035022 | A1 | | 2/2008 | Hamada et al. | |
| 2008/0268269 | A1 | | 10/2008 | Kobata et al. | |

FOREIGN PATENT DOCUMENTS

| JP | 10183012 A2 | 7/1998 |
| JP | 2006001863 A2 | 1/2006 |

OTHER PUBLICATIONS

Phosphorus, Sulfur and Silicon, 1999, vol. 144-146, pp. 133-136, F. Zeuner, et al.
Polymer Preprints, 1997 38(2), pp. 143-144 J. satz, P. Burtscher, K. Vogel, N. Moszner and V,. Rehinberger.

* cited by examiner

*Primary Examiner* — Michael M Bernshteyn
(74) *Attorney, Agent, or Firm* — Tifani M. Edwards

(57) ABSTRACT

The present invention relates to a process for providing improved low VOC polymerizable compositions containing phosphoalkyl (meth)acrylate monomers which are synthesized by the reaction of a hydroxyalkyl (meth)acrylate with polyphosphoric acid (PPA).

4 Claims, No Drawings

POLYMERIZABLE COMPOSITIONS

This patent application claims the benefit of the earlier filed U.S. patent application Ser. No. 61/211,419 filed on Mar. 30, 2009 under 37 CFR 1.55(a).

The present invention relates to a process for providing improved low VOC polymerizable compositions containing phosphoalkyl (meth)acrylate monomers which are synthesized by the reaction of a hydroxyalkyl (meth)acrylate with polyphosphoric acid (PPA).

People spend a significant amount of time indoors, which has caused more concern about the quality of the air we breathe while inside buildings. Products and materials in homes and office buildings emit pollutants and chemicals, many of which may raise health concerns. One class of pollutants that has come under particular scrutiny is volatile organic compounds (VOCs). These compounds are ubiquitous, and much attention has been given to identifying the source of VOCs and reducing their emissions.

VOCs are emitted from a surprising number of articles used in everyday life, particularly from virtually all resin-based man-made materials. Varnishes and coatings have been used previously to provide a protective finish over surfaces such as vinyl wall-coverings, floor products, furniture and printed articles. Examples of such products are described in U.S. Pat. No. 4,603,074. These overcoats provide protection against stains and damage, but are not designed to and do not reduce emission of VOCs to the environment.

When subjected to co-polymerization with other vinyl monomers, phosphoalkyl (meth)acrylates impart useful properties to polymers, namely those which are employed in coatings and binders and which have a wide range of uses. One application for these monomers is the promotion of polymeric coating adhesion to metal substrates. Other uses include providing flame-retardant and anti-static properties to fibers and binders for non-woven fabrics.

A problematic aspect of these polymer mixtures relates to high viscosity. The PPA raw material, the reaction mixture, and the reaction product have high viscosities, which slow mass transfer and pose general material handling problems. One solution to lower the product viscosity is to conduct the reaction in the presence of a solvent or to dilute the final reaction product with a solvent. Reference JP 2006-001863A states that inert, aprotic solvents, such as aromatics and saturated aliphatics, are solvents for the phosphorylation reaction. The use of such solvents, however, is unfavorable due to their emission of Volatile Organic Compounds (VOCs), which are harmful to the population at large and therefore such solvents need to be removed. Costly processing time to remove the solvent is incurred, and when the solvent is removed, the problematic viscosity of the composition returns.

The present invention solves these problems of the art by providing a process that comprises a phosphorylation reaction that is conducted in the presence of a reaction solvent, specifically a polymerizable solvent. The process for conducting the reaction may be batch or continuous. Significant improvements can be made even at low solvent levels, such as at about 15 wt. %, which is especially beneficial for batch processes in that good reactor productivity can be maintained.

Accordingly, the present invention provides a process for providing improved polymerizable compositions comprising reacting at least one hydroxyalkyl (meth)acrylate with at least one polyphosphoric acid in the presence of at least one polymerizable solvent.

With proper choice of polymerizable solvent, the solvent will incorporate into the polymer matrix and become part of the final polymer product; thus, there is no need to remove the solvent after the phosphorylation reaction. The reaction pressure is selected, according to the choice of solvent and reaction temperature, to ensure that boiling of the reaction mixture is suppressed. Thus, the reaction pressure should exceed the vapor pressure of the reaction mixture.

As used herein, polymerizable solvent is meant any olefinically polymerizable species with solvent-bearing properties that is capable of polymerizing with the phosphoalkyl methacrylate in the polymerizable composition's application except that the hydroxyalkyl (meth)acrylate monomers employed in the reaction and the phosphoalkyl methacrylate product itself are excluded from the present definition of polymerizable reactive solvent. Preferably, the solvent and temperature are selected to allow atmospheric reaction pressure.

These polymerizable solvents, or "diluent monomers," do not need to be removed from the reaction mixture prior to use in the final application. These solvents are used at 10 to 90 wt. % of the final reaction mixture. Suitable examples of polymerizable solvents include but are not limited to $C_1$-$C_{20}$ linear, branched, or cyclic alkyl esters of acrylic or methacrylic acid including but not limited to heterocyclic (meth)acrylates (such as 3-oxazolidinyl ethyl methacrylate, 5-[2-oxazolinyl]-pentyl methacrylate); aminoalkyl (meth)acrylates (such as N,N-dimethyl amino-ethyl acrylate, N,N-diethyl amino-propyl methacrylate); (meth)acrylamides (such as N-methyl acrylamide, N,N-dimethylaminopropyl methacrylamide); epoxide-containing (meth)acrylates (such as glycidyl (meth)acrylate); unsaturated alkyl and cycloalkyl (meth)acrylates (such as vinyl acrylate, allyl methacrylate, 2,4-hexadienyl methacrylate and dicyclopentenyl oxyethyl methacrylate); silicon-containing (meth)acrylates (such as trimethoxysilylpropyl acrylate, diethoxymethylsilylpropyl methacrylate, ispropoxydimethylsilylpropyl acrylate); aromatic (meth)acrylates (such as benzyl acrylate, phenyl acrylate, 4-chlorophenylethyl methacrylate); straight chain or branched haloalkyl (meth)acrylates (such as 2,2,2-trifluoroethyl acrylate, hexafluoroisopropyl methacrylate); terminal alkenes (such as 1-butene, 1-hexene, vinyl-cyclohexene); aralkenes (such as styrene, α-methyl styrene, 4-methyl styrene, 4-methoxy styrene); heterocyclic alkenes (such as 2-, 3-, or 4-vinyl pyridines and N-vinyl imidazole); dienes (such as butadiene, isoprene, vinylidene chloride); vinyl halides (such as vinyl chloride, tetrafluoroethylene); vinyl esters (such as vinyl acetate, vinyl benzoate); vinyl ketones (such as methyl vinyl ketone); vinyl amides (such as N-vinyl formamide, N-vinyl acetamide); vinyl isocyanate; aldehyde containing vinyl functionality (such as acrolein, methacrolein, and their acetal derivatives); epoxyalkenes (such as 3,4-epoxybut-1-ene); cyano containing vinyl functionality (such as acylonitrile, methacrylonitrile and fumaronitrile); vinyl silanes and alkoxyvinyl-silanes (such as vinyltrimethoxysilane, vinyltrimethylsilane, vinyldiethoxymethylsilane); unsaturated diesters (such as dimethylmaleate, dibutylfumarate, diethyl itaconate); and functional (meth)acrylates (such as isocyanotoethyl methacrylate, acryloylchloride, aceto acetoxyethyl methacrylate, acryloylpropionic acid [AOPA]); or mixtures thereof.

Specifically, it is surprising that these polymerizable solvents can be employed as solvents for this reaction due to their propensity to undergo Michael-type addition, via the olefinic double bond, with hydroxy-containing species, i.e., the hydroxyalkyl (meth)acrylate reaction substrate. Of principal concern for making the subject polymerizable compositions is the loss of monoester yield on the hydroxyalkyl (meth)acrylate substrate due to consumption of the latter via these Michael reactions. In the present reaction systems employing polymerizable solvents, the monoester yield was maintained and in many cases, such as for the use of methyl methacrylate, was actually found to increase.

EXAMPLES

Comparative Example 1

A reaction apparatus comprising a 500 mL, jacketed, glass "resin kettle" reaction flask; a two-stage agitator; and a reflux condenser was assembled. Heating and cooling were affected by means of a Thermo Scientific NESLAB RTE 740 circulator bath, which supplied Dynalene HF-LO heat transfer fluid to the reactor jacket. The bath temperature was adjusted to achieve the desired reactor temperature. The two-stage agitator comprised a bottom blade set (3-in. diameter, four-blade, 45-deg. pitch) and a middle blade set (2.5-in. diameter, three-blade, swept pitch), which was positioned at two-thirds of the reactor's straight-side height from the bottom. A thermocouple, a sparge gas tube, and a feed tube were positioned near the top of the bottom agitator blade set. The condenser was vented to the atmosphere via a drying tube.

In a separate feed vessel, a reservoir of 2-hydroxyethyl methacrylate, having less than 0.15 wt. % water, was adjusted to contain by weight 1950 ppm methoxyphenol.

Polyphosphoric acid (115% grade, 400 g) was charged to the empty reaction flask. A 10 sccm flow of 8% $O_2$/92% $N_2$ mixed gas was then introduced to the reactor via the sparge tube. The agitator was set to 180 rpm, and the polyphosphoric acid was heated to 65° C. After heating the acid, 437 g of the 2-hydroxyethyl methacrylate was fed via a peristaltic pump and the feed tube into the reactor, which was operated at 65° C., over seven hours. The resulting mixture was held at 65° C. for an additional six hours and then cooled to room temperature.

The reaction product was analyzed by high-performance liquid chromatography using an Agilent 1100 Series LC System liquid chromatograph equipped with a Supelco Inc. Discovery Bio Wide Pore C18 column (25 cm by 4.6 mm, 5 µm media) and an ultraviolet light detector.

The reaction product contained 44.7 wt. % monoester and 10.5 wt. % diester, a corresponding monoester:diester molar ratio of 6.53.

Example 1

A reaction product was generated by the same procedure given in Comparative Example 1 except that 169 g of methyl methacrylate were mixed with the polyphosphoric acid prior to addition of the 2-hydroxyethyl methacrylate. The reaction product, on a basis excluding the methyl methacrylate, contained 47.0 wt. % monoester and 9.43 wt. % diester, a corresponding monoester:diester molar ratio of 7.64.

Example 2

A reaction product was generated by the same procedure given in Comparative Example 1 except that 302 g of methyl methacrylate were mixed with the polyphosphoric acid prior to addition of the 2-hydroxyethyl methacrylate. The reaction product, on a basis excluding the methyl methacrylate, contained 47.9 wt. % monoester and 7.58 wt. % diester, a corresponding monoester:diester molar ratio of 9.69.

Example 3

A reaction product was generated by the same procedure given in Comparative Example 1 except that 418 g of methyl methacrylate were mixed with 200 g polyphosphoric acid prior to addition of 218 g 2-hydroxyethyl methacrylate. The reaction product, on a basis excluding the methyl methacrylate, contained 51.0 wt. % monoester and 7.24 wt. % diester, a corresponding monoester:diester molar ratio of 10.8.

Comparative Example 2

A reaction product was generated by the same procedure given in Comparative Example 1 except that the reaction temperature during both the addition of the 2-hydroxyethyl methacrylate and the hold period was 45° C. The reaction product contained 38.3 wt. % monoester and 5.37 wt. % diester, a corresponding monoester:diester molar ratio of 10.9.

Example 4

A reaction product was generated by the same procedure given in Comparative Example 2 except that 169 g of methyl methacrylate were mixed with the polyphosphoric acid prior to addition of the 2-hydroxyethyl methacrylate. The reaction product, on a basis excluding the methyl methacrylate, contained 41.4 wt. % monoester and 4.75 wt. % diester, a corresponding monoester:diester molar ratio of 13.4.

Example 5

A reaction product was generated by the same procedure given in Comparative Example 2 except that 418 g of methyl methacrylate were mixed with 200 g polyphosphoric acid prior to addition of 218 g 2-hydroxyethyl methacrylate. The reaction product, on a basis excluding the methyl methacrylate, contained 45.9 wt. % monoester and 4.31 wt. % diester, a corresponding monoester:diester molar ratio of 16.3.

Example 6

A reaction product was generated by the same procedure given in Comparative Example 2 except that 181 g of butyl acrylate were mixed with the polyphosphoric acid prior to addition of the 2-hydroxyethyl methacrylate. The reaction product, on a basis excluding the butyl acrylate, contained 38.1 wt. % monoester and 3.89 wt. % diester, a corresponding monoester:diester molar ratio of 15.0.

Example 7

A reaction product was generated by the same procedure given in Comparative Example 2 except that 175 g of methacrylic acid were mixed with the polyphosphoric acid prior to addition of the 2-hydroxyethyl methacrylate. The reaction product, on a basis excluding the methacrylic acid, contained 30.1 wt. % monoester and 2.20 wt. % diester, a corresponding monoester:diester molar ratio of 21.0.

Example 8

A reaction product was generated by the procedure given in Comparative Example 1 where the reaction temperature during both the addition of the 2-hydroxyethyl methacrylate and the hold period was 35° C. To conduct the reaction, 418 g of methyl methacrylate were mixed with 200 g polyphosphoric acid prior to addition of 218 g 2-hydroxyethyl methacrylate. The reaction product contained 40.0 wt. % monoester and 3.33 wt. % diester, a corresponding monoester:diester molar ratio of 18.4.

What is claimed is:

1. A process for providing improved low VOC polymerizable compositions comprising reacting at least one hydroxyalkyl (meth)acrylate with at least one polyphosphoric acid in the presence of at least one polymerizable solvent wherein the polymerizable solvent is at least one compound selected from the group consisting of:

$C_1$-$C_{20}$ linear, branched, or cyclic alkyl ester of acrylic or methacrylic acid, aminoalkyl (meth)acrylates, (meth)acrylamides, epoxide-containing (meth)acrylates, unsaturated alkyl and cycloalkyl (meth)acrylates, silicon-containing (meth)acrylates, aromatic (meth)acrylates, straight chain or branched haloalkyl (meth)acrylates, terminal alkenes, aralkenes, heterocyclic alkenes, dienes, vinyl halides, vinyl esters, vinyl ketones, vinyl amides, vinyl isocyanate; aldehydes containing vinyl functionality, epoxyalkenes, cyano containing vinyl functionality, vinyl silanes and alkoxyvinyl-silanes, unsaturated diesters, and functional (meth)acrylates, or mixtures thereof.

2. The process of claim 1 wherein the reaction is a batch reaction.

3. The process of claim 1 wherein the reaction is continuous.

4. The process of claim 1 wherein the reaction occurs at a temperature below 40° C.

* * * * *